(12) United States Patent
Nayak et al.

(10) Patent No.: US 8,709,150 B2
(45) Date of Patent: Apr. 29, 2014

(54) COMPOSITION FOR BUILDING MATERIAL AND A PROCESS FOR THE PREPARATION THEREOF

(75) Inventors: Bandshidhar Nayak, Orissa (IN); Barada Kanta Mishra, Orissa (IN); Snehasis Behera, Orissa (IN); Rajeev, Orissa (IN); Vimal Kumar, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 116 days.

(21) Appl. No.: 13/601,836

(22) Filed: Aug. 31, 2012

(65) Prior Publication Data

US 2012/0318173 A1 Dec. 20, 2012

Related U.S. Application Data

(62) Division of application No. 12/262,274, filed on Oct. 31, 2008, now Pat. No. 8,257,486.

(30) Foreign Application Priority Data

Mar. 26, 2008 (IN) .............................. 774/DEL/2008

(51) Int. Cl.
*C04B 14/00* (2006.01)
*C04B 18/06* (2006.01)

(52) U.S. Cl.
USPC ............ 106/708; 106/705; 106/706; 106/707

(58) Field of Classification Search
USPC .............. 106/705, 697, 706, 707, 287.1, 708; 423/327.1, 326.1, 332
See application file for complete search history.

(56) References Cited

U.S. PATENT DOCUMENTS 5,366,548 A * 11/1994 Riddle .......................... 106/705

OTHER PUBLICATIONS

Shi et al., Acceleration of the reactivity of fly ash by chemical activation, 1995, cement and concrete research, vol. 25, No. 1 pp. 15-21.*

* cited by examiner

*Primary Examiner* — Ling-Siu Choi
*Assistant Examiner* — Monique Peets
(74) *Attorney, Agent, or Firm* — Dickinson Wright PLLC

(57) ABSTRACT

The present invention provides a composition and a process for the preparation of chemical activated cold setting fly ash building construction materials. The chemical activator is an alkaline aqueous solution of 11.2 to 13.6 in pH and 1.25 to 1.40 gm/cc in density which contains admixtures of different concentrations of hydroxyl, sulfate, acetate and chloride bearing chemical salts of calcium, magnesium, sodium, potassium and aluminum in water medium. The reaction of chemical activator solution and the mineral constituents of fly ash mix develop binding property. The binding matrix of chemical activated fly ash mix is mostly hydrous silica and silicate group of phases which on setting under atmospheric condition attains strength suitable for building construction application. Utilization of fly ash of any source by weight ranges from 80 to 99% in manufacture of building materials including heat and acid resistance and toxic waste disposal products.

7 Claims, No Drawings

COMPOSITION FOR BUILDING MATERIAL AND A PROCESS FOR THE PREPARATION THEREOF

FIELD OF THE INVENTION

The present invention relates to a process for the preparation of chemical activated cold setting fly ash building construction materials.

BACKGROUND OF INVENTION AND DESCRIPTION OF PRIOR ART

The cold setting products manufactured from fly ash comprises materials in form of brick, block, tiles, plate, concrete or monolithic, aggregates etc, which possess sufficient mechanical strength, low porosity and water absorption, heat and acid resistance properties. These products of fly ash are suitable for use in road building and other constructional activities including construction of heat and acid resistance structures. The materials made up by chemical activation of fly ash along with other additives are also useable for encapsulation and fixation of various toxic constituents of polluting solid wastes in making rock forming bodies for safe disposal.

Coal fired thermal power plants in the process of electricity production generate burnt mineral matters of coal known as ash. These are particulate materials and collected from the boiler exhaust gas and grate in form of fly ash as major fraction and bottom ash in smaller amount. All together it is mixed and disposed as fly ash. Generation of ash of coal fired thermal power plant is enormous and mostly it remains unused as a waste material. Gradual accumulation of thermal plant fly ash overloads in disposal problems and pollution of air, water and soil of the surrounding environment. Utilization of fly ash in gainful manner is a serious concern for sustainable growth of thermal plant and to save the associated environment pollution. Many research activities and process developments have been made for the use of fly ash in construction, agriculture, land and mine filling etc. A considerable work and many process developments also have been carried out for the utilization of fly ash as a raw material in manufacture of building material products like brick, block, and concrete, hydraulic cements etc. Utilization of fly ash construction sector is a greater important to save natural occurring soil, clay and aggregates for the protection of environment. Manufacturing of building bricks from clay or alluvial soil by firing in brick kilns is an age old and traditional practice. Utilization of fly ash in manufacturing of building brick and block like products by replacing clay has been given more focus for its wider application in all sectors of society.

Fly ash, a waste of thermal power plant, is a different type of non traditional material as compared to clay or alluvial soil. Many processes have been developed on manufacturing of fly ash based building brick and block like products. It is mostly used as a raw material in different proportions for filler, matrix and bond forming agent, chemical admixture in association with other additives to develop binding strength in manufacture of strong and acceptable quality building brick or block and other construction materials. Different methods and manufacturing steps such as firing to form oxide matrix bonding by thermal effect, hydro-thermal and hydration reactions to form hydroxide matrix bonding are well known and already in practice to use fly ash mix materials in production of building brick, block and construction related products.

So far sufficient R & D efforts have been put into study on manufacturing of fly ash based building brick and block like products. Reference may be made to the following disclosures: Firing methods at different temperature in manufacturing of building brick and related construction materials from fly ash has been disclosed. Fly ash is used with other additives and also plasticizing material in various proportions to form green moulds of brick or block shape products and it is subjected for drying and firing to develop strength for use as a construction material. The process involves various conventional steps of mixing, molding, drying/curing and firing. Fly ash in association with other additives develops oxide bonding matrix by thermal reaction which imparts strength to the products suitable for building construction use. Different workers have revealed the process on the use of various additives and methods of mixing, molding, drying of fly ash based materials in manufacture of fired building products.

Smith; Robert H (U.S. Pat. No. 4,120,735) describes the manufacturing of fired bricks using coal fly ash with 50% weight of other non-ferrous and municipal incinerator residue and sodium silicate binder for preparation of green articles of brick or block, curing and drying of green articles 12 hours to 5 days at low temperature of below 100° C. and then firing in between 1000° C. to 1300° C. for 30 minutes to 6 hours depending up on the mix proportion. The fly ash based fired building products produced by this method develops strength up to 30 MPa and 5 to 20% water absorption.

Riddle; Mitchell S (U.S. Pat. No. 5,405,441) also explains the manufacturing of building construction brick and other material from fly ash and other hazardous wastes by firing method. It discloses the use of pozzolanic fly ash with the additives of cement, lime, gypsum plaster, polymers, resins, volcanic ash, clay, aggregate, hazardous wastes includes asbestos, contaminated soil, pesticides, medical and municipal incinerator ash, PCB contaminants, radioactive waste, heavy metal and gasification ash in production of waste encapsulated solid brick and block like products useful as a construction material adopting firing for sintering at 1400° C. and coating of exterior surface by liquefying fly ash mixture.

U.S. Pat. No. 5,665,290 describes a manufacturing process of making fired building brick from burnt materials of brown coal. The process discloses the use of various additive materials like ground glass, quartz, lime with brown coal ash in presence of water to improve the pozzolanic reaction and stability in drying the molded articles suitable for preparation of fired building products.

Kayali, Obada; et al. (U.S. Patent No. 20050109242) describes manufacturing of fly ash matrix bonded sintered fly ash brick as a replacement of conventional fired clay brick. It discloses the use of both type of class-F and -C fly ash blended with plasticizer carboxymethyle cellulose or calcium chloride and water in preparation of green articles, curing of the articles at 30 to 80° C. at 20% to 60% relative humidity for 12 hours to 5 days and firing of the article in between 1000 to 1300° C. in manufacture of building material brick and block like products. Use of high lime fly ash like class-C improves the rate of solidification at green stage and reduces curing period and firing time of the articles. The bonding material is mostly hydrates of calcium silicate and alumino-silicate at the green stage and on firing it develops oxide structures as bonding matrix of the fly ash. The bricks produced by this process exhibits crushing strength more than 30 MPa, modulus of rupture more than 5 MPa and 5 to 20% water absorption and the product quality is superior than conventional fired clay brick.

Hydro-thermal process has also been used to produce building material products. This is a process of accelerated curing under temperature and steam pressure to enhance the formation of binding matrix in development of strength of the building material product in short time. This method of hydro-thermal treatment has already been reported in manufacture of calcium silicate and sand-lime bricks using the mixtures of sand/siliceous materials and lime. Lime (CaO) present in the mixture reacts with silica and siliceous constituents under hydro-thermal condition and forms crystalline structures of hydrated calcium silicate phases as the binding matrix in the product. Utilization of fly ash as a substitute for sand or siliceous material in manufacture of Sand-Fly ash-Brick has been disclosed in the report "Material Research Standards, USA, 1964 and Research Association of Calc-Sand stone, Germany". Under hydro-thermal reaction the fly ash base mixture with lime develops multi phases of calcium base hydrated mineral structures which impart bonding of the particulates and strength to the product. The bonding phases in the fly ash based materials are mostly hydrated crystalline phases of calcium-aluminum-silicate and calcium silicates. Hydro-thermally developed binding phases in manufacture of fly ash based building materials has been disclosed by many workers.

U.S. Pat. No. 3,501,323 discloses the hydro-thermal processes for manufacture of building, structural and paving products based up on blending extremely fine siliceous with calciferous materials The molds of the mixture prepared in presence of water by compaction pressure is hydro-thermally treated at a temperature of about 250° C. for a time a time of 30 minutes to form calcium-silicate binding matrix for strength in the product.

German Patent application DE-A-3321899 describes the use of coal fired power plant ash, slacked lime and water in preparation of brick-form elements after which the bricks are hardened with the use of steam pressure at 14-16 bar and temperature of between 180 to 220° C.

U.S. Pat. No. 4,683,006 discloses in production of construction aggregates using the mixtures of pulverized fly ash with lime. The shaped article prepared from the mixture is cured in a moisture controlled atmosphere in the temperature range of 35° C. to 80° C. The strength of the shaped articles is attributed by the formation of hydrated crystallites of ettringite and amorphous calcium silicates, calcium aluminite and calcium aluminum silicates.

Loggers; Hendrik (U.S. Pat. No. 4,780,144) discloses some improvement in the process steps in making fly ash based building articles under hydrothermal reaction at low pressure and temperature. It describes the use of fly ash preferably calcium sulfate containing ash, slacked lime, quartz flour and water in formulation of granulated particles by hardening at 100° C. temperature in atmospheric pressure and then mixing of these hardened particles as a replacement of coarse materials with or without gravel, sand, B. F. Slag, gypsum and hematitic rock in formulation of useable building elements by hardening in steam chamber under atmospheric pressure for 8 hours. Formulation of dimensional stable building material article is made under the influence of vibration, shocking, pressing or extruding. Strength development under the hydro-thermal curing in the brick/block like elements is in between 12 to 28 N/mm$^2$.

Strabala; William W (U.S. Pat. No. 5,534,058) discloses manufacturing of lightweight, good strength and fire resistant structural products such as brick, panels and studs etc using fly ash with the additives of cellulose based (wood, paper pulp) materials and adhesive (polyvinyl acetate) binders. The molded articles prepared by applying pressure are cured in steam (water vapor) at a temperature up to 150° F. for a period of about 28 days to maximize the strength and hardness suitable for building material use.

Seike, et al. (U.S. Pat. No. 5,584,895) describes the method of hydro-thermal treatment in manufacture of fly ash mix building materials. Fly ash based molded articles prepared with water and lime bearing materials like calcium oxide, calcium hydroxide is cured at 30 to 90° C. temperature for 2 to 5 hours and then the cured articles are treated for hydro-thermal reaction under saturated steam vapor pressure between 120 to 250° C. for hardening. Fly ash with reaction of lime under this condition mainly produces tobermorite, a hydrated phase of calcium and silica (C—S—H) as the binding matrix to impart strength to the extent of 400 kg/cm2 in the product suitable for making concrete like articles. It also discloses the use of blowing agent to make lightweight and hydroxides and carbonate of alkali metals and ammonia to improve strength and freeze-thaw resistance of fly ash based products.

Weyand, et al. (U.S. Pat. No. 6,068,803) discloses the hydro-thermal process in manufacture of building brick and block like products from fly ash. The molded articles prepared from the mixtures of fly ash and lime are hydro-thermally cured in the saturated steam temperature of between 180-225° C. under pressure 150 psig to 350 psig for 4 to 8 hours in the autoclave. Strength in the product is achieved by hydro-thermally grown interlocking matrix of calcium silicate based Tobermorite ($Ca_5$ $Si_6$ $O_{17.5}$ $H_2O$) crystalline phases.

Hydraulic hardening by curing under atmospheric condition is also in use for manufacture of fly ash based building construction materials. The pozzolanic property of the fly ash is being considered in this process to develop cementitious binding matrix under natural hydration in presence of additives mostly lime bearing materials. The hydration reaction on formation of bonding matrix under natural condition is slow as compared to the hydro-thermal treated products. Many findings of fly ash application as a cementitious filler and pozzolanic material in manufacturing of hydraulic cements, concrete and building products have been disclosed. Processes on manufacturing of hydraulic setting building bricks and blocks from fly ash by natural curing have been described.

U.S. Pat. No. 4,397,801, U.S. Pat. No. 5,350,549 and U.S. Pat. No. 5,211,750 reveal the use of different additives such as spent fluid bed combustion residue containing limestone, oxidic sulphur, with or with out port land cement with fly ash to form hydraulic bonding matrix by curing for 28 days in atmospheric condition in manufacture of building brick and block.

U.S. Pat. No. 5,358,760, U.S. Pat. No. 5,362,319, U.S. Pat. No. 5,366,548 and U.S. Pat. No. 5,374,307 disclose the manufacture of cementitiously bonded construction products of fly ash brick and block by curing in atmospheric condition using various additives like lime, clay, port land cement, gypsum, calcium carbonate, plaster of paris and oxidants.

U.S. Pat. No. 5,154,771 discloses the use of fly ash with port land cement, polysaccharide molding aid and reinforcing fiber and water in manufacture of cold setting building products. U.S. Pat. No. 5,366,548 describes the manufacturing of construction brick and blocks using class-c fly ash with kiln dust by applying high pressure during molding and then atmospheric curing. U.S. Pat. No. 3,625,723 and U.S. Pat. No. 4,659,385 describe manufacture of cellular light weight construction product from fly ash with the combination of aluminum phosphate solution, calcium silicate, aluminum hydroxide, air entrainer and foaming agent etc as the bonding matrix.

Development of cementation matrix for hardening the substances primarily calcium base hydrated structures of similar characteristics of hydrated Portland cement by hydro-thermal reaction under temperature and pressure and natural hydration under atmospheric condition have been reported in the manufacture of fly ash building bricks and related products. Further many other binding materials other than Portland cement have been explored to use in the construction industry and solidification of waste materials. Some efforts have been made on the development of alkaline base inorganic binders for their application in solidification of waste materials and also in making structural products. The said inorganic binders have been prepared by admixture of various constituents which forms hydroxylated structures and develops binding property.

U.S. Pat. No. 5,820,668, Comrie discloses preparation of inorganic binders of two different compositions based upon the admixtures of (sodium oxide, tricalcium silicate, dicalcium silicate, calcium aluminate, aluminium oxide, ferric oxide, sulphur trioxide) and (fumed silica, anhydrous aluminium silicate, silicic acid, sodium or potassium salts). The inorganic binders are curable in saline, corrosive and acidic environmental conditions. These binders are used as a replacement of cement in agglomeration, briquette form, of metallurgical wastes like coke breeze, slag, mill scale and flue dust for recycling into the furnace.

U.S. Pat. No. 5,194,091, Laney discloses a method of making self hardening inorganic binder based upon the admixture of alkali metal silicate, calcium meta-silicate (wollastonite) as strengthening agent, hydrous aluminium silicate (clay type) as thickening agent, sodium fluorosilicate as setting agent, calcium/magnesium chloride and zinc oxide applicable in formulation of bonding matrix in strengthening of gypsum base construction products.

Loney in other work U.S. Pat. No. 5,244,726 also discloses a similar admixture of in preparation of inorganic binder where kaolin and fly ash as strengthening agent and sodium laurel sulfate as a surfactant are being used for consolidation of organic and inorganic particulates and fibers in making temperature resistance foamed composites.

Further some other inorganic mineral polymer (geopolymeric) binders of polysialate structures based upon alkaline alumino-silicate compositions have been developed for constructional application. The binder is of alkaline base silico-aluminate polymeric compounds having the characteristics three-dimensional tetrahedral frame works of silicon and aluminium. The tetrahedral are cross-linked by sharing oxygen molecules to form inorganic polymeric network. The alkaline material based upon alumino-silicate polysialate types set for hardening in different conditions such as hydrothermal, elevated temperature and atmospheric temperature. Different workers have explained various methods of preparation of alkaline phases of alumino-silicate polysialate type binders and their applications.

U.S. Pat. No. 4,249,386, U.S. Pat. No. 4,472,199, U.S. Pat. No. 4,509,985 and U.S. Pat. No. 5,342,595 Davidovits, et al. reveals the methods for preparation of alumino-silicate polysialate type alkaline mineral binder based upon the reaction of potassium/sodium silicate and hydroxide with the oxides of alumino-silicate $(Si_2O_5.Al_2O_2)_n$ materials where the aluminum cation is in four fold coordinated state. The binder develops strength by solidification at room and elevated temperature (120° C.). The U.S. Pat. No. 5,352,427 Davidovits, et al. also discloses the preparation of fluoro-alumino-silicate polysialate type hydraulic binder improved in mechanical and heat resistance properties for application in making ceramic products. U.S. Pat. No. 4,888,311, Davidovits describes the use of alkaline alumino-silicate mineral polymer in developing binding matrix by hydrothermal poly-condensation for preparation of composite ceramic materials. U.S. Pat. No. 5,539,140 discloses the method of obtaining alumino-silicate polysialate type termed as geopolymeric binder in powder by the reaction of oxides of alumino-silicate $(Si_2O_5, Al_2O_2)_n$ materials where the aluminum cation is in four fold coordinated state, disilicates of potassium or sodium and silicates of calcium with improved setting and hardening property.

Preparation of alumino-silicate polysialate type geo-polymeric hardened material has been reported by many workers (1-9). Some of the work defines the dissolution of vitreous components (alumino-silicate glass) of fly ash with alkaline solution in forming polymeric structures of silica and alumina as the binding phase which under temperature develops hardening strength, The effect of composition of non-crystalline glassy structures of coal fly ash on forming geopolymeric binding material have been described (10). It is reported that the geo-polymeric compositions made from fly ash with alumino-silicate glassy phase and calcium bearing alumino-silicate glassy phase when cured above 95% humidity at 23 degree temperature develops 9.5 MPa and 47.5 MPa respectively as the crushing strength. In most cases (11) geo-polymer compositions made from the combinations of fly ash, kaolinite, mica and other alumino-silicate materials are set for hardening in thermal conditions in the temperature ranging from 30° C. to 70° C. The cited references as mentioned below explains to extent the development of alumino-silicate binder based on geopolymeric compositions and its application in making construction materials, ceramics, immobilization of heavy metals and stabilization of mine tailings etc.

Different processes such as firing, hydro-thermal and hydration reactions adopted in manufacture of building construction materials like brick, block and other products using fly ash have been disclosed. These processes explain the formulation of different types of binding matrix that imparts strength and other mechanical properties to the fly ash building products. The firing method develops oxide phases of fly ash binding matrix and the hydro-thermal and hydration method develops hydro-silicate type of binding matrix as the essential feature in developing strength of the fly ash building products. The process adopted on firing at different temperature in manufacture of fly ash building construction products is energy intensive and uneconomical and environmental polluting due to burning of fuel. The other process on formulation of calcium-silicate types of bonding matrix in presence of lime and portland cement and alumino-silicate polysialate type geo-polymeric hardening matrix by hydro-thermal and hydration reactions in producing fly ash building construction products is advantageous over firing processes.

The process of hydro-thermal reaction also requires temperature and steam pressure for curing and hardening which makes the process more complicated and expensive. Further, the process also needs mostly reactive and high pozzolanic character fly ash which makes the process more conducive to use all types of fly ash that generates in the thermal plant. The process of hydro-thermal and hydration reaction based on alumino-silicate polysialate type geo-polymeric binding matrix is also composition specific and also requires mostly glassy structures of alumino-silicate phases of fly ash as the reactant material. Fly ash is used as a partial replacement with other alumino-silicate material to form geo-polymer matrix. Thus it restricts the scope for utilization of different types fly ash available as waste by this process.

In addition the process on formulation of fly ash geo-polymer matrix in manufacturing of building construction materials involve specific quality fly ash, number of processing steps and chemical admixtures, surfactants, catalyzing agents and other source of reactive and costly alumina and silica additives and specific curing and hardening in thermal and humidity conditions not only makes the process complicated but also uneconomical in commercial application. Fly ash, a by-product waste of coal based thermal power plant, is an abundantly available material and a cheap resource of alumina and silica. Thus, adoption of suitable method for complete utilization of alumina and silica of the fly ash in the process of developing binding matrix is advantageous and cost effective for manufacture of fly ash building products. Brick, block and other related construction materials are common building products and their manufacturing process needs to be commercially competitive. Simpler process steps, use of low cost chemical admixture and silica and alumina of fly ash in high volume for commercially competitiveness is of more significant in production of fly ash building products. Thus there exists a need to provide a process that overcomes the aforesaid limitations.

OBJECTIVES OF THE PRESENT INVENTION

The main objective of the present invention is thus to provide a process for the manufacture of chemical activated cold setting fly ash building construction materials which obviates the drawbacks as detailed above.

Another object of the present invention is to provide a process for utilization of high volume i.e., more than 80% of fly ash by weight for producing brick and block and other products.

Still another object of the present invention is to provide a chemical activator that reacts with fly ash and forms binding matrix suitable in production of building brick, block concrete including other high strength construction materials.

Yet another object of the present invention is to provide a simple method of curing that develops strength of fly ash with other material blend building products by exposing in atmospheric conditions.

A further object of the present invention is to provide flexibility to use fine and coarse varieties of other inorganic and organic solid wastes that generates from chemical, metallurgical and mining along with the fly ash in manufacture of cold setting building products.

SUMMARY OF THE INVENTION

The present invention provides a process the for preparation of chemical activated cold setting fly ash building construction materials including brick and block, comprising the steps of mixing of fly ash in an amount more than 80% by wt. and optionally other solid materials with chemical activators in the presence of water for the preparation of homogenized mixture. Casting the said mixture by vibration or compaction in machine or hand mold to form the building material articles. Curing of the said articles for about 4 to 72 hours in air.

Accordingly, the present invention provides a composition for building material comprising:
(a) fly ash in the range of 80 to 98% by weight;
(b) 1 to 10% by wt of chemical activator comprising hydroxides, sulfates, acetates and chlorides bearing calcium, magnesium, aluminum, sodium and potassium chemical salts in water;
(c) optionally along with 2 to 18% of additive materials of the kind such as herein described.

The invention further provides a process for the preparation of the said building materials, comprising the steps of:
mixing of 1 to 10% by weight of the said chemical activator with 80 to 98% by weight of fly ash and optionally 2 to 18% with other additive materials and water for a period of about 6 to 12 minutes to obtain a homogenized mixture having 8 to 28% moisture by weight;
casting or molding the homogenized mixture as obtained in step (a) in the form of brick, block and other articles by vibration or compaction in machine or manual operation techniques;
curing of the articles as obtained in step (b) by exposing either to atmospheric air having a temperature of about 20 to 35° C. for about 72 to 720 hours or in air of temperature above 40° C. for about 4 to 10 hours to obtain the desired building materials.

In an embodiment of the present invention, the sources of the material are the combustion residue of pulverized coal of thermal power stations collected in form of fly ash and bottom ash in hoppers or silos or disposed in slurry pond and mixtures thereof.

In another embodiment of the present invention, the fly ash, pond ash and mixtures thereof is used in the range of 80 to 99% by weight.

In still another embodiment of the present invention, the particle fineness of fly ash or mixtures thereof is below 2 millimeter sizes consisting of finer fractions less than 0.09 millimeter is minimum 25% by weight.

In yet another embodiment of the present invention, the additives are selected from the group consisting of metallurgical slag, waste aluminous refractory, slag wool, building material debris, resins and plastics, red mud of Bayer's alumina process, aluminous and alumino-silicate type of clay and mining wastes and mixtures thereof.

In another embodiment of the present invention, the chemical activator is an aqueous solution consisting of chemical salts of hydroxides and sulfates of sodium, aluminium and potassium along with acetates and chlorides of calcium and magnesium in different concentrations.

In a further embodiment of the present invention, the weight ratio of chemical salts to water in the chemical activator solution is about 1:1 to 1:5.

In another embodiment of the present invention, the chemical activator solution consists the chemical salts of hydroxide to sulfate in 10:1 and sulfate to acetate and chloride in 1:0.01 weight ratio.

In yet another embodiment of the present invention, the chemical activator solution is alkaline in nature and ranges from 11.2 to 13.6 in pH and 1.25 to 1.40 gm/cc in solution density.

In still another embodiment of the present invention, the amount of chemical activator solution in preparation of mixtures ranges from 1 to 10% by weight of fly ash.

In yet another embodiment of the present invention, water content of chemical activated mixture of fly ash and thereof is between 8 to 28% by weight.

In a further embodiment of the present invention, the casting, molding and forming of the mixtures to building material articles is by conventional methods of vibration, extrusion or compaction in machine or hand operating techniques.

In another embodiment of the present invention, the curing duration to develop binding strength of building material articles exposed in atmospheric air is minimum 72 hours and air of above 40° C. temperature is minimum 4 hours.

In yet another embodiment of the present invention, the binding matrix responsible in development of strength of the chemical activated fly ash building product is hydrous silica and silicates of alumina, calcium, magnesium, sodium and potassium phases.

In a further embodiment of the present invention, the crushing strength of chemical activated fly ash building material article consisting mostly of alkaline base silico-aluminate hydrous binding matrix is about 22 MPa.

In another embodiment of the present invention, the crushing strength of chemical activated fly ash building material article consisting mostly of calcium bearing silico-aluminate hydrous binding matrix is about 86 MPa.

In still another embodiment of the present invention, the cold setting building material article including brick or block consisting of 95 to 99% fly ash and 1 to 5% by weight of chemical activator attains about 7 to 25 MPa crushing strength.

In yet another embodiment of the present invention, the cold setting building construction and other structural product consisting of about 80% fly ash and other lime, iron, magnesia bearing fines and granular material in presence of chemical activator ranging up to 10% by weight attains as high as 75 MPa and above crushing strength.

In still another embodiment of the present invention, the assemblages of calcium bearing silico-aluminate hydrous (scolecite) type and other lime bearing silica and silicate phase imparts higher crushing strength to the product.

In yet another embodiment of the present invention, the lime content in formation of scolecite type and other lime bearing silica and silicate phases in the chemical activation fly ash mix is about 3% and more.

DETAILED DESCRIPTION OF THE INVENTION

Fly ash of the pulverized coal fired thermal power plant collected from any field and pond of the slurry disposal site, other lime, magnesia and iron bearing solid wastes and chemical activator are the ingredients in preparation of mixture for making cold setting building material articles including brick or block shaped products. The chemical activator used in the mix is prepared before hand using the chemical salts of hydroxides and sulfates of sodium, aluminium and potassium along with acetates and chlorides of calcium and magnesium in different concentrations in water, wherein the concentration of the said chemicals in water is in the weight ratio of 1:1. The concentration of reactive chemical salts of hydroxide to sulfate and sulfate to acetate+chloride remains at least in the weight ratio of 10:1 and 1:0.01 respectively in the solution. The chemical activator solution is alkaline in nature and ranges from 11.2 to 13.6 in pH and 1.25 to 1.40 gm/cc in solution density. The reactive hydroxyl ions, aluminates and pH modifier ions of the alkaline chemical activator solution helps in reaction and dissolution of different oxide mineral phases of silica and silicates of the fly ash and the additive materials which forms hydro silicates of aluminium, calcium, magnesium and iron phases as the binding matrix.

Depending on the composition of fly ash and other additives, the chemical activator solution is used in the range of 1 to 10% by weight of the mix. While mixing the ingredient feed with chemical activator solution optionally some extra water is added at that time of preparation of homogenized mixture. The resultant water content in the homogenized wet mix suitable for casting, molding, forming and shaping of building construction products including brick or block by machine or hand process is between 8 to 28% by weight. Presence of excess water in the mix causes spillage and loss of chemical solution during casting or forming. Thus, depending up on the absorption capacity and behavior of hydration reaction of the mix ingredients, the addition of extra water is decided. The time of mixing for uniform mixing of feed ingredients with chemical activator solution is about 6 to 12 minutes.

Fly ash and their mix with pond ash or bottom ash are usually fine materials where the size of the particles remains mostly below 2 mm of which fractions less than 0.090 millimeter (170 mesh BSS sieve) size is minimum 25% by weight. The additive materials such as granulated blast furnace slag, red mud, refractory and ceramic, mining wastes optionally used as reactive material are in finer form that is of below 100 micron size for making brick and block or concrete like products. Finer is the particle better is the chemical reaction and higher gain in strength of the products. Thus, depending on the type of additives and the purpose of product making, the granulometry of additive material is considered for blending to the fly ash mix. Other than finer particles, the coarser size materials of above 2 mm sizes are also useable with the fly ash mix for improvement of mechanical strength of the product.

The wet mixture discharged from the mixing unit is used to cast articles of building brick, block, slab and concrete like products. The conventional casting methods such as vibration, compaction, extrusion by mechanical or manual are applicable in manufacturing of building material products. Development of strength of articles takes place by curing and drying in air. The curing of articles in atmospheric air is slow and normally it takes many days to reach the maximum strength. The cast articles are normally cured in atmospheric air at 20 to 35° C. temperature develop about 60 to 80% of total strength which requires minimum 3 days (72 hours) of duration. In case of faster and rapid hardening, the caste articles which are cured in air of temperature between 40 to 80° C. require minimum 4 hours to attain the optimum strength. Atmospheric temperature influences the rate of hardening of chemically activated fly ash products. In summer, where the atmospheric temperature is above 40° C., the development of strength in the product is fast. The articles after proper curing becomes hard and strong which makes it suitable for constructional use.

Fly ash generates from pulverized coal fired thermal power station is a burnt material consisting of major constituents of silica and alumino-silicate phases. Silica ($SiO_2$) of the burnt coal occurs in thermally converted polymorphic structures mostly in form of quartz, tridymite, cristobalite and glassy phases. Alumino-silicate phases are the dehydrated transition to crystalline structures of clay and feldspar type of mineral matters of the burnt coal. Mineralogicaly, the burnt coal ash contains quartz, crystalline structures of alumino-silicates in form of mullite ($3Al_2O_3 \cdot SiO_2$), iron phases in form of hematite ($Fe_2O_3$), magnetite ($Fe_3O_4$), metallic iron and their glassy particulates of different sizes. Lime (CaO) which mostly remains in Class-C type coal ash occurs in modified structures with silica, alumino-silicate and glassy phases. In general the burnt ash of coal contains essentially 40-65% $SiO_2$, 16-34% $Al_2O_3$, 3-12% $Fe_2O_3$, 2-5% MgO, 1-3% $TiO_2$, 0.5-1.5% $Na_2O$ and $K_2O$. The lime (CaO) content of burnt ash of coal of Class-F and Class-C is less than 5% and more than 10% respectively. In respect to over all particle fineness, the d50 size of the fly ash ranging from 10 to 160 millimicron makes the fly ash reactive to the alkaline medium.

The constituents of amorphous and crystalline phases of alumino-silicates, silica of fly ash and calcium oxides/silicates, calcium-magnesium-aluminium-silicates, iron silicates/oxides of the additives react with chemical activator solution in alkaline pH and forms hydrated compounds which imparts strength on curing in the product. The hydrated compounds responsible in providing strength in the product are the three dimensional structures of sodium base silico-aluminate and calcium-silico-aluminates akin to zeolite phase and hydrates of calcium-silicates, calcium-aluminium-silicate, calcium-magnesium/iron-silicate phases of similar characteristics of hydrated phases of Portland cement. These phases occur in amorphous to crystalline structures. The assemblages of different hydrated phases play a significant role in developing bonding strength of the fly ash mix products. The formation of different hydrated phases and the strength depends on the concentration of chemical activator in the mix. The mix consisting of 99% fly ash and 1% chemical activator solution in weight attains crushing strength about 8.5 MPa under curing 30 days in atmospheric air and 10 hours in hot air of 60° C. temperature. Similarly the mix consisting of 90% fly ash and 10% chemical activator solution in weight attains about 8.5 MPa crushing strength in 3 days in atmospheric air and 4 hours in hot air of 60° C. temperatures after curing. The strength of cast product of fly ash increases with the increase of chemical activator in the mix. The mix consisting of 90% fly ash and 10% chemical activator attains about 22 MPa crushing strength in the product on curing in atmospheric air or hot air. The fly ash mix with chemical activator consisting of lime bearing material results higher strength in the product. The crushing strength of the mix consisting of 80% fly ash and 20% lime bearing material such as ground B.F. slag attains about 20 MPa with 1% chemical activator and 86 MPa with 10% chemical activator under curing in atmospheric air and hot air. The major reactant matrix of the reaction of chemical activator with fly ash is hydrous structure of sodium base silico-aluminates and with lime (CaO) enriched fly ash mix is sodium and lime base hydrous phases. These hydrous silica and alumina phases impart cementation property in bonding of particles and development of strength after curing in normal atmospheric air or in hot air. These hydrous mineral phases are some extent crystalline in nature. The crystalline structure nearer to d—5.36, 3.35, 2.69, 2.54, 2.22 $A^0$ of X-ray diffraction pattern of resemblance to sodium-silico-aluminate ($Na_2O\ Al_2O_3\ 4SiO_2\ 2H_2O$) analcide mineral phases. The other reaction structures of hydrous minerals of X-ray diffraction pattern resemblance to d—5.36, 3.33, 2.88, 2.20 $A^0$ of scolecite ($CaO\ Al_2O_3\ 3SiO_2\ 3H_2O$), phases and d—4.27, 3.33, 2.69, 1.81 $A^0$ of garronite ($Na_2O\ 5CaO\ 6Al_2O_3\ 20SiO_2\ 27H_2O$) phase and d—4.27, 3.02 2.88, 1.70 $A^0$ of calcium-silicates of xenotlite phase form in the mix consisting of fly ash and lime bearing materials including B.F. slag.

The cementation matrix phases of fly ash mix consisting of lime bearing material is mostly sodium and calcium base silico-aluminate ($Ca.O\ Al_2O_3\ 3SiO_2\ 3H_2O$) scolecite matrix. This mineral phase occurs also in association with garronite ($Na_2O\ 5CaO\ 6\ Al_2O_3\ 20SiO_2\ 27H_2O$) and sodium silico-aluminate of analcide phases. The hydrous phases of sodium-silico-aluminate of analcide ($Na_2O\ Al_2O_3\ 4SiO_2\ 2H_2O$), scolecite ($CaO\ Al_2O_3\ 3SiO_2\ 3H_2O$) and garronite ($Na_2O\ 5CaO\ 6Al_2O_3\ 20SiO_2\ 27H_2O$) with minor substitution of magnesia and iron are of significance cementation matrix in development of cold setting strength of the fly ash mix products. The product consisting of binding matrix mostly calcium bearing silico-aluminate (scolecite) phases results in higher bonding strength in comparison to the product consisting of mostly sodium-silico-aluminate phases. Formation of calcium bearing silico-aluminate (scolecite) phases in the product takes place when the mix of fly ash contains about 3% of CaO (calcium oxide) by weight. The formation of calcium bearing silico-aluminate (scolecite) and other phases of binding matrix and the development of strength of the product increases with the increase of lime concentration from 3% to above in the fly ash mix. The fly ash mix product without the presence of lime develops mostly sodium-silico-aluminate type of hydrous bonding matrix that provides about 6 to 22 MPa as the crushing strength. The fly ash mix product with lime bearing materials forms mostly scolecite ($CaO\ Al_2O_3\ 3SiO_2\ 3H_2O$) and garronite ($Na_2O\ 5CaO\ 6Al_2O_3\ 20SiO_2\ 27H_2O$) bonding matrix phases which exhibits about 20 to 86 MPa as the crushing strength. The development of product strength depends on particle fineness and chemical composition of the reactant mix. The increase of particle fineness of the fly mix as well as lime concentration results in increase of strength of the products. The fly ash mix consisting of particles below 150 micron, 90 micron and 45 micron sizes exhibit 10 MPa, 18 MPa and 22 MPa respectively as the crushing strength in the product. Similarly the fly ash consisting of calcium oxide (CaO) of 4 to 8% with the addition of lime bearing material, the mix particles of below 150 micron, 90 micron and 45 micron sizes exhibit 30 MPa to 76 MPa crushing strength in the product. Such type of mix design is suitable for making high strength (ranging up to 75 MPa and above) concrete and block like products, encapsulation and consolidation of toxic solids for safe disposal.

The chemical activated fly ash building products consisting of sodium silico-aluminate and calcium-silico-aluminate phases of bonding matrix are stable and resistance to the temperature up to 600° C. with out any change in dimension and physical properties as compared to other cement base matrix. The cementation matrix that imparts bonding strength in the product is mostly the chemical reacted hydrous phases of sodium, calcium, magnesium, iron base silica and alumino-silicates. The strength of the product is related to the concentration of chemical activator, mix composition, fineness and the types of bonding matrix. Construction material such as building brick of 8 to 16 MPa crushing strength using more than 95% fly ash and concrete like block of 20 to 75 MPa crushing strength using fly ash of about 80% and above is flexible to produce economically by chemical activation as disclosed in the present invention. The structural product containing mostly sodium silico-alumininate hydrous phase is applicable in acid, saline and other chemical resistance constructions.

Formulation of chemical activator solution suitable to use of all types of fly ash, cold stage reaction and cold setting hardening, use of low cost and commercial grade chemicals, flexibility in mix design to use fine and coarse materials, adoption of different cost effective and economical means of manufacturing of products, simpler curing steps adopting atmospheric conditions, and utilization of high volume fly ash ranging up to 98% by weight, characteristics of high strength and other mechanical properties are some special features of the present process for manufacturing of chemical activated cold setting fly ash base building constructional materials including brick, block, pavement tiles, plate concrete etc.

The invention of present process has been established by conducting series of experiments on laboratory scale (20 kg mix) in making cube size samples and on higher scale (100 kg mix) by machine mixing and casting methods identical to commercial production in making the building brick, block, foot path plates and tiles using different types of fly ash and pond ash of the thermal plant and other wastes such as iron and steel making granulated B.F. slag, alloy slag, red mud, beneficiated residue of iron, chrome, copper, reject fines of calcined clay, dolomite, serpentine and feldspar material, aluminous refractory, ceramics and glass, chemical plant resins and plastics etc. The green articles of the building material products have been cured to evaluate the physical and mechanical properties.

The following examples are given by way of illustration and therefore should not be construed to limit the scope of the present invention.

EXAMPLE-1

Fly ash collected from hopper of a thermal power station contains 96% of particles of size below 100 mess BSS and 29% $Al_2O_3$, 56% $SiO_2$, 2.4% CaO, 4.7% $Fe_2O_3$, 0.82% $Na_2O$ and 2.9% residual carbon. The major crystalline mineral constituents of silica and alumino-silicates of the fly ash is quartz and mullite with minor association of iron phases of hematite, magnetite and metallic iron and glassy silicates. The d50 size particles of the fly ash is 110 micron and amount of fine particles of below 90 micron size is 60% by weight. This fly ash is used in preparation mixture for making cubes and full size building brick, block and concrete like products.

2 liters of the chemical activator solution consisting of different concentration of hydroxyl, sulfate and chloride ions of pH 12.9 is mixed with 98 kg fly ash in a pan mixer with the addition of water for 10 minutes. The chemical water solution contains sodium aluminate ($Na_2O\ Al_2O_3$) and sodium sulfate as reactive constituents. Total water content of the resultant mixture is 10%. The wet fly ash mixture discharged from the pan is used to cast the molded articles of 70×70×370 mm size cubes and brick shape articles of 230×110×80 mm size by vibration and compaction machine.

The cast articles are kept exposed to atmosphere of temperature of about 32° C. up to 30 days and air of temperature of about 60° C. in the air circulating oven up to 8 hours for curing and development of strength. The cubes exposed in atmospheric curing attain 6 Mpa on 30th day and 8.5 Mpa on 60th day as the crushing strength. The cube cured for 8 hours in air of temperature of 60° C. attains to the maximum strength of about 9 Mpa. In atmospheric curing, the cube attains about 70% of strength in 30 days. Similar phenomena on development of strength of the article happen in the product of brick and block.

The properties of building brick cured for 30 days in atmospheric air range from 5 Mpa to 6 Mpa crushing strength, 12 to 18% water absorption. The properties of building brick cured for 8 hours in air temperature of 60° C. range from 6.5 Mpa to 8.5 Mpa crushing strength, 10 to 16% water absorption. The crushing strength of full size brick is usually less with respect to the strength measured on equi-dimensional size cube. The average strength of brick (10 bricks) containing 98% fly ash is about 6.4 MPa. The dry bulk density of the brick varies from 1340 to 1400 kg/m³.

EXAMPLE-2

5 liters of chemical activator solution (Example-1), 95 kg fly ash and some additional water is mixed in a pan type mixer for 10 minutes. Total water content of the mixture is 12% by weight The weight ratio of chemical water solution in the fly ash mix is 0.05. The mixture is used to cast cube and brick shape articles by casting in machine.

The cubes (size—70×70×70 mm) cured by exposing atmosphere (30° C. temperature) air for 30 days attains about 11.5 MPa to 14 MPa crushing strength. The water absorption of the cube ranges from 4 to 7%. The cube cured by exposing to the air of temperature of 40° C. and 60° C. for 8 hours develops 13 MPa and 21.5 MPa respectively as the crushing strength. The water absorption of the cube ranges from 2 to 6%.

The bricks (size-230×110×80 mm) cured in atmospheric air for 30 days develops 11.5 MPa to 14 MPa crushing strength. The water absorption of the brick ranges from 6 to 10%. The bricks (size-230×110×80 mm) cured for 8 hours exposing to 60° C. air temperature develops 14.5 MPa to 17 MPa crushing strength. The water absorption of the brick ranges from 6 to 8%.

The average strength of fly ash building brick (10 bricks) containing 95% fly ash is 12 Mpa. The dry bulk density of the brick varies from 1440 to 1550 kg/m³.

EXAMPLE-3

Chemical activator solution of pH 13.2 consisting of sodium aluminate ($Na_2O\ Al_2O_3$), sulfate and chloride reactants is prepared using the concentration 1:1 weight ratio of chemical and water.
 (a) 80 kg fly ash (Example-1), chemical solution 4 liters and 16 kg granite aggregate (below 10 mm size) is mixed altogether with extra water for 6 minutes to prepare the mixture for casting block.
 (b) 80 kg fly ash (Example-1), chemical solution 4 liters, 16 kg aggregate of crystalline B.F. slag (below 10 mm size) and water is mixed altogether for 6 minutes to prepare mixture for casting block.

Both the mix is used to cast 100×100×100 mm size cube by vibration and compaction method. The vibration time in the casting mold is 2 minutes. After 12 hours of casting, the cubes are removed from the mold and kept exposed for curing and development of strength.

The cube consisting of granite aggregate develops about 16 MPa cured in atmospheric condition for 30 days and about 22 MPa cured at 60° C. air temperature for 6 hours. The dry bulk density of the cube varies from 1740 to 1850 kg/m³.

The cube consisting of crystalline slag aggregate develops about 18 MPa cured in atmosphere for 30 days and about 26 MPa cured in 60° C. temperature air for 6 hours. The dry bulk density of the cube varies from 1840 to 1900 kg/m³.

The mix consisting of about 80% fly ash and coarser size aggregate is suitable for making blocks of crushing strength ranging up to 26 MPa.

EXAMPLE-4

2 liters of chemical activator solution of 11.8 pH consisting of hydroxyl, sulfate and acetate ions of required concentrations is mixed with 88 kg fly ash (Example-1), 10 kg ground granulated B.F. slag (size below 100 micron) and water in a pan mixer for 10 minutes. The mixture is used for casting cube (70×70×70 mm size) and brick (230×110×80 mm size) by vibration machine. Then the cast articles are exposed for curing in atmospheric air and hot air. The cubes cured for 30 days in atmospheric air develop about 14.5 Mpa and 8 hours in 60° C. temperature air of about 21 Mpa as the crushing strength. The mix casting in full size building brick, shows average crushing strength (10 brick) 12.5 MPa and 16 MPa respectively by curing in atmospheric and hot air condition. Water absorption of the brick is 8 to 14% and dry bulk density of the brick varies from 1540 to 1650 kg/m³.

EXAMPLE-5

5 liters of chemically treated water solution of 11.8 pH consisting of hydroxyl, sulfate and acetate ions of required concentrations is mixed with 85 kg fly ash (Example-1), 10 kg ground granulated B.F. Slag (size below 100 micron), and water are mixed altogether in a pan mixer for 10 minutes. The mixture is used for casting cube (70×70×70 mm size) and brick (230×110×80 mm size) by vibration machine. Then the cast articles are exposed for curing in atmospheric air and hot air. The cubes develop about 32 MPa and 44 Mpa crushing strength respectively cured 30 days in atmospheric air and 8 hours in 60° C. temperature air. The mix casting in full size building brick, shows average crushing strength (10 brick)

24.5 MPa and 28 MPa respectively by curing in atmospheric and hot air condition. Water absorption of the brick is less than 8%. The dry bulk density of the brick varies from 1640 to 1750 kg/m$^3$.

It explains that the mix consisting of fly ash and lime bearing material from the source of B.F. slag with increase of chemical activator from 2 to 5%, the crushing strength in the brick increases from 12.5 MPa to 24 MPa respectively.

EXAMPLE-6

5 liters of chemical activator solution of 12.0 pH consisting of hydroxyl, sulfate and acetate ions of required concentrations is mixed with 80 kg fly ash (Example-1), 15 kg ground granulated BF.slag (size below 100 micron) and water altogether in a pan mixer for 10 minutes. The mixture is used for casting cube of size 100×100×100 mm by vibration machine. Then the cast articles are exposed for curing in atmospheric air and hot air. The cubes in presence lime bearing phase exhibits rapid gain in strength. In 72 hours the cube under atmospheric curing attains about 10 to 14 MPa of crushing strength. With time, the strength of the cube gradually increases and reaches to the extent of 40 to 52 MPa in 30 days. The maximum strength of the cubes cured in 60° C. air temperature reaches to 82 MPa.

It explains that the fly ash mix consisting of lime bearing material considerably increases the product strength. The mix consisting of 80% fly ash and 15 to 18% B.F. slag and 2 to 5% chemical activator solution is suitable for making high strength building products of block and concrete.

EXAMPLE-7

3 liters of chemical activator solution of 11.8 pH consisting of hydroxyl, sulfate and acetate ions of required concentrations is mixed with 80 kg fly ash (Example-1), 7 kg ground granulated BF.slag (size below 100 micron), 10 kg granite aggregate (below 10 mm size) and water altogether in a pan mixer for 10 minutes. The mixture is used for casting cube of size 100×100×100 mm by vibration machine. Then the cast articles are exposed for curing in atmospheric air and hot air. The cubes in presence lime bearing phase exhibits rapid gain in strength. In 72 hours the cube under atmospheric curing attains about 11 to 14 MPa of crushing strength. With time, the strength of the cube gradually increases and reaches to the extent of 34 to 38 MPa in 30 days. The maximum strength of the cube in hot air curing reaches to 54 MPa.

It explains that the fly ash mix consisting of lime and granular aggregate material increases the product strength. The mix consisting of 80% fly ash, B.F. slag powder and coarse aggregate and 2 to 5% of chemical activator is suitable for making high strength building products of block and concrete.

EXAMPLE-8

Red mud is a waste of Bayer's alumina process residue that generates from the caustic soda digested bauxite after extraction of alumina. The residue is a fine mud like material consisting of 38 to 58% Fe2O3, 5 to 11% Al2O3, 8 to 16% SiO2 and 4 to 7% Na2O as alkali. Most of the alkali of the red mud occurs combined with iron, silica and alumina phases. The particle of the red mud is mostly below 45 micron size.

Chemically activator solution consisting of required concentrations of hydroxyl and sulfate ions is prepared. The pH of the solution is 12.4. The solution contains reactive sodium aluminate ($Na_2O\ Al_2O_3$) and neutralizer sodium sulfate.

2 Liters of the above solution, 80 kg fly ash (Example-1), 18 kg red mud and water are mixed altogether in a pan mixer for 12 minutes. The mixture is used for casting cube of size 70×70×70 mm and building brick 230×110×80 mm size by vibration machine. Then the cast articles are exposed for curing in atmospheric air and hot air.

The cube (70×70×70 mm size) cured for 30 days exposing to the atmosphere (30° C. temperature) develops 14.5 MPa to 16 MPa crushing strength. The water absorption of the cube ranges from 2 to 5%.

The cube cured for 8 hours exposing to the 40° C. and 60° C. air temperature develops 16 MPa and 20.5 MPa respectively as the crushing strength. The water absorption of the cube ranges from 2 to 6%.

The average crushing strength in brick (size-230×110×80 mm) cured for 30 days exposing to the atmosphere and for 8 hours in 60° C. hot air is 12 MPa to 18 MPa. The water absorption of the brick ranges from 6 to 10%.

EXAMPLE-9

2 Liters of Chemical activator solution of pH of 11.8 consisting reactive sodium aluminate ($Na_2O\ Al_2O_3$) and neutralizer sodium sulfate, 80 kg fly ash (Example-1), 10 kg red mud, 8 kg B.F. slag (−100 micron fraction) and water are mixed altogether in a pan mixer for 12 minutes. The weight ratio of mix ingredient and chemical solution is 0.02. The mixture is used for casting cube of size 100×100×100 mm. Then the cast articles after de-molding are exposed for curing in atmospheric air and hot air. The de-mold time is 12 hours from the time of casting.

The average crushing strength of cube (10 samples) cured for 30 days exposing to the atmosphere and for 8 hours in 60° C. hot air is respectively 32 MPa and 48 MPa. The water absorption of the concrete cube ranges from 6 to 10%. The dry bulk density of the cube varies from 1750 to 1900 kg/m$^3$.

It explains (Example-8 and 9) that the fly ash mix consisting of lime and iron source material like B.F. slag and red mud is suitable for making high strength building product such as brick and block ranging from 12 MPa to 48 MPa crushing strength.

EXAMPLE-10

Pond ash is a disposed material of water mix slurry of fly ash and bottom ash. The pond ash selected of a thermal power station contains 90% of particles of size below 60 mess BSS and 24% $Al_2O_3$, 58% $SiO_2$, 21.8% CaO, 6.7% $Fe_2O_3$, 0.62% $Na_2O$ and 4.9% residual carbon. The major crystalline mineral constituents of silica and alumino-silicates of the pond ash is quartz and mullite with minor association of iron phases of hematite, magnetite and metallic iron. The d50 size particles of the pond ash are 150 micron and amount of fine particles of below 90 micron size is 20% by weight. The pond ash is used in preparation mixture for making cubes and full size building brick like products.

50 kg Pond ash, 46 kg fly ash (Example-1), 4 Liters of chemical activator of pH 12.5 consisting of reactive sodium aluminate ($Na_2O\ Al_2O_3$) and sodium sulfate as neutralizer and 7 liters of water is mixed in a pan mixer thoroughly for 8 minutes. Total water content of the mixture is 14% by weight. The mixture is used to cast cube and brick.

The cubes (70×70×70 mm size) cured for 30 days exposing to the atmosphere (30° C. temperature) develops 7.5 MPa to 8 MPa crushing strength. The water absorption of the cube ranges from 14 to 19%. The cube cured for 8 hours exposing to the 40° C. and 60° C. air temperature develops 9 MPa and 12.5 MPa respectively as the crushing strength. The water absorption of the cube ranges from 15 to 20%.

The bricks (size-230×110×80 mm) cured for 30 days exposing to the atmosphere develops 5.5 MPa to 7 MPa crushing strength. The water absorption of the brick ranges from 16 to 20%. The dry bulk density of the brick ranges from 1340 to 1420 kg/m$^3$. The bricks (size-230×110×80 mm) cured for 8 hours exposing to 60° C. air temperature develops 8.5 MPa to 10 MPa crushing strength. The water absorption of the brick ranges from 16 to 20%. The dry bulk density of the brick ranges from 1300 to 1380 kg/m$^3$.

The average strength of pond ash mix building brick (10 bricks) containing 46% fly ash is 8 Mpa.

EXAMPLE-11

5 Liters of chemical activator of pH 12.5 consisting of reactive sodium aluminate (Na$_2$O Al$_2$O$_3$) and sodium sulfate as neutralizer, 40 kg Pond ash, 40 kg fly ash (Example-1), 15 kg B.F. slag is mixed with 8 liters of water thoroughly in a pan mixer for 10 minutes. The mixture is used to cast cube and brick.

The cubes (70×70×70 mm size) cured for 30 days exposing to the atmosphere (30° C. temperature) develops 26 MPa to 37 MPa crushing strength. The water absorption of the cube ranges from 8 to 12%.

The cube cured for 8 hours exposing to the 40° C. and 60° C. air temperature develops 28 MPa and 44 MPa respectively as the crushing strength. The water absorption of the cube ranges from 6 to 10%.

The bricks (size-230×110×80 mm) cured for 30 days exposing to the atmosphere develops 18 MPa to 23 MPa crushing strength. The water absorption of the brick ranges from 8 to 14%. The dry bulk density of the brick ranges from 1540 to 1620 kg/m$^3$.

The bricks (size-230×110×80 mm) cured for 8 hours exposing to 60° C. air temperature develops 25 MPa to 30 MPa crushing strength. The water absorption of the brick ranges from 6 to 12%. The dry bulk density of the brick ranges from 1570 to 1680 kg/m$^3$.

The examples illustrate that the chemical activator consisting of hydroxyl, sulfate, chloride, acetate ions acts a reactive medium in dissolution silica and silicates of alumina, calcium, magnesium, iron bearing materials of fly ash and other additives which on setting in atmospheric air develops binding property and strength in the product. Both type of ash such ash fly ash and pond ash is suitable for use. The fly ash mix consisting of lime and iron bearing material is suitable for making building material concrete and other product such as brick and block. Use of red mud with fly ash favors in increase of strength, reduction of porosity of the product. Depending on the composition of mix ingredients, purpose of constructional application and cost economics, the economical use of chemical activator is a decisive factor for production of building material products.

The Main Advantages of the Present Invention are:
1. Utilization of 80 to 98% by weight of fly ash and pond ash as a high volume material in the chemical activation process for manufacture of cold setting building products
2. Flexibility for use of other wastes consisting of lime, iron and magnesium, silica and alkalis.
3. Scope for utilization of ultra fine and granular material of any source with fly ash.
4. Easy and simpler conditions in designing the raw mix suitable for manufacturing of building products including brick, block and concrete.
5. Cheap and economical in formulation of chemical activator solution.
6. Curing condition is very simple and in atmospheric condition.
7. Better physical and mechanical properties of the product.
8. Cost competitiveness in commercial production.
9. The chemical activated fly ash building products are also suitable for use in acid, heat and salinity conditions.
10. Environmental-friendly green process of making alternate building material from waste.

REFERENCES

1. Palomo, A., Grutzeck, M-W., Blanco, M. T. "Alkali-activated fly ashes a cement for the future" Cement and Concrete Research, Vol 29, 1999, pp. 1323-1329.
2. Fernandez-Jimenez A. and Palomo A. "Alkali-activated fly ashes: properties and characteristics". 11th International Congress on the Chemistry of Cement (Durban, South Africa) Vol 3, 2003, pp 1332-1340.
3. Fernandez-Jimenez A. and Palomo A. "Characterisation of fly ashes. Potential reactivity as alkaline cements" FUEL, 82, 2003, pp. 2259-2265.
4. Krivenko, P. V., "Alkaline cements", in: P. V. Krivenko (Ed.). Alkaline cements and concretes. 1. Vipol Stock Company. Kiev. 1994, pp 11-129.
5. Palomo, A., Fernandez-Jimenez, A., and Criado M,. "Geopolymers: one only chemical basis, some different microstructures" Mater Construcc, (2004, in press).
6. Criado M., Palomo A., Fernandez-Jimenez, A., "Alkali activation of fly ashes. Effect of curing conditions on the nature of the reaction products" FUEL (submitted for publication 2004).
7. Puertas F. and Fernandez-Jimenez, A., "Mineralogical and microstructural characterisation of alkali-activated fly ash/slag pastes". Cem. and Concr. Compo. No. 25, 2003, pp. 287-292.
8. Fernandez-Jimenez A., Palomo A. "Microstructural development of alkali-activated fly ash cement. A descriptive model" Cement and Concrete Research (submitted for publication 2004)
9. Van Jaarsveld J. G. S., Van Deventer J. S. J., and Lukey G. C. "The effect of composition and temperature on the properties of fly ash and kaolinite-based geopolymers" Chemical Engineering Journal, Vol 89, 2002, pp. 63-73.
10. Palomo, A., Alonso, S., Fernandez-Jimenez, A., Sobrados I. and Sanz J. "Alkaline activation of fly ashes. A $^{29}$Si NMR study of the reaction products" J. Am. Ceramic. Soc. (2004, in press).
11. Louise M. k, Lukey G. C. and Van Deventer J. S. J. "The effect of coal ash composition on properties of waste-based Geopolymers" International Symposium of Research students on Material Science and Engineering, Dec. 20-22, 2004, Chennai, India.
12. Xu, H and Van Devanture, J S J, 2000b. The geopolymerisation of alumina-silicate minerals, International Journal of Mineral Processing, 59:247-266.

What is claimed is:
1. A process for producing building materials, comprising the steps of:
(a) mixing 1 to 10% by weight of a chemical activator comprised of at least one hydroxide selected from the group consisting of aluminum hydroxide, sodium hydroxide and potassium hydroxide, at least one sulfate selected from the group consisting of aluminum sulfate, sodium sulfate and potassium sulfate, and at least one salt selected from the group consisting of calcium acetate, magnesium acetate, calcium chloride and magnesium chloride with 80 to 98% by weight of fly ash, 2 to 18% additive materials selected from the group consisting of particles of metallurgical slag, waste aluminous refractory, slag wool, building material debris, resin, plastic, red mud of Bayer's alumina process, aluminous and alumino-silicate clay and mining wastes and mixtures thereof, and is included as a mixture comprised of finer fractions of below 100 mesh size and coarse granular fractions of 2 mm and above, and water for a period of about 6 to 12 minutes to obtain a homogenized mixture having 8 to 28% moisture by weight;

(b) casting or molding the homogenized mixture as obtained in step (a) in the form of brick or block by vibration or compaction; and (c) curing the brick or block as obtained in step (b) by exposing to atmospheric air having a temperature of about 20 to 35° C. for about 72 to 720 hours or in air at a temperature above 40° C. for about 4 to 10 hours to produce the building materials.

2. The process according to claim 1, wherein the casting or molding is carried out by vibration, compaction and extrusion.

3. The process according to claim 1, wherein the fly ash is comprised of combustion residue of pulverized coal of thermal power stations.

4. The process according to claim 1, wherein the fly ash is included in the homogenized mixture at a particle size of below 2 millimeters, with not more than 25% by weight of the fly ash being less than 0.09 millimeters.

5. The process according to claim 1, wherein the homogenized mixture comprises the salt and water at a weight ratio of from 1:1 to 1:5.

6. The process according to claim 1, wherein the chemical activator comprises the hydroxide and sulfate at a weight ratio of 10:1, and the sulfate and salt at a weight ratio of 1:0.01.

7. The process according to claim 1, wherein the chemical activator is mixed in alkaline solution, at a pH ranging from 11.2 to 13.6, and the solution has a density of from 1.25 to 1.40 gm/cc.

* * * * *